United States Patent [19]

Hellman et al.

[11] 4,424,414

[45] Jan. 3, 1984

[54] EXPONENTIATION CRYPTOGRAPHIC APPARATUS AND METHOD

[75] Inventors: Martin E. Hellman, Stanford, Calif.; Stephen C. Pohlig, Acton, Mass.

[73] Assignee: Board of Trustees of the Leland Stanford Junior University, Stanford, Calif.

[21] Appl. No.: 901,770

[22] Filed: May 1, 1978

[51] Int. Cl.³ .............................................. H04K 9/00
[52] U.S. Cl. ................................ 178/22.11; 178/22.1; 178/22.14
[58] Field of Search ...................... 178/22, 22.1, 22.11, 178/22.14; 179/1.5 R

[56] References Cited

U.S. PATENT DOCUMENTS 4,079,188  3/1978  Kinch, Jr. et al. ..................... 178/22

OTHER PUBLICATIONS

"New Directions in Cryptography", Hellman et al., *IEEE Transactions on Information Theory*, vol. IT-22, No. 6, Nov. 76, pp. 644-654.
"Multiuser Cryptographic Techniques", Diffie et al., *AFIPS-Conference Proceedings*, vol. 45, pp. 109-112, Jun. 1976.

*Primary Examiner*—Sal Cangialosi
*Attorney, Agent, or Firm*—Flehr, Hohbach, Test, Albritton & Herbert

[57] ABSTRACT

A cryptographic system transmits a computationally secure cryptogram that is generated from a secret transformation of the message sent by the authorized transmitter; the cryptogram is again transformed by the authorized receiver using a secret reciprocal transformation to reproduce the message sent. The secret transformations use secret cipher keys that are known only by the authorized transmitter and receiver. The transformations are performed with nonsecret operations, exponentiation, that are easily performed but extremely difficult to invert. It is computationally infeasible for an eavesdropper either to solve known plaintext-ciphertext pairs for the secret cipher keys, or to invert the nonsecret operations that are used to generate the cryptogram.

2 Claims, 6 Drawing Figures 4,424,414

EXPONENTIATION CRYPTOGRAPHIC APPARATUS AND METHOD

BACKGROUND OF THE INVENTION

The Government has rights in this invention pursuant to grant No. ENG-10173 of the National Science Foundation and IPA No. 0005.

FIELD OF INVENTION

The invention relates to cryptographic systems.

DESCRIPTION OF PRIOR ART

Cryptographic systems are widely used to ensure the privacy and authenticity of messages communicated over insecure communication channels. A privacy system prevents unauthorized parties from extracting information from messages transmitted over an insecure channel, thus assuring the sender of a message that it is being read only by the intended receiver. An authentication system prevents the unauthorized injection of messages into an insecure channel, assuring the receiver of the message of the legitimacy of its sender.

One of the principal difficulties with existing cryptographic systems is the difficulty of assessing their security level. Most cryptographic systems utilize many, complex operations so that a mathematical statement that describes their security level is also complex and difficult, if not impossible, to evaluate.

SUMMARY AND OBJECTS OF THE INVENTION

Accordingly, it is an object of the invention to allow authorized parties to a conversation (conversers) to establish a secret cipher key and then converse privately even though an unauthorized party (eavesdropper) intercepts their communications.

Another object of this invention is to allow a converser on an insecure channel to authenticate another converser's identity.

Another object of this invention is to provide a cryptographic system with a more easily evaluated security level.

An illustrated embodiment of the present invention describes a method and apparatus for communicating securely over an insecure channel with prearrangement of a secret cipher key. The secret cipher key is used to encipher and decipher messages via transformations which are computationally infeasible to invert without the secret cipher key; the enciphered message is transmitted over an insecure channel with a more easily evaluated security level.

In the present invention, a secret enciphering key is generated and is known by a transmitter but not known by an eavesdropper. A secret deciphering key is generated and is known by a receiver but not known by the eavesdropper. The transmitter generates an enciphered message by transforming a message with the secret enciphering key, which transformation is computationally infeasible to invert without the secret deciphering key. The enciphered message is transmitted over the insecure channel to the receiver. The receiver deciphers the message by inverting said transformation with the secret deciphering key, which inversion is computationally infeasible to perform without the secret deciphering key.

Another illustrated embodiment of the present invention describes a method for allowing a receiver to authenticate a transmitter as the source of an enciphered message. A secret enciphering key is generated and is known by a transmitter but not known by an eavesdropper. A secret deciphering key is generated and is known by a receiver but not known by the eavesdropper. The receiver receives an enciphered message and deciphers the message by transforming the enciphered message with the secret deciphering key, which transformation is computationally infeasible to invert without the secret deciphering key. The receiver authenticates the transmitter as the source of the enciphered message by the transmitter's ability to transmit a meaningful enciphered message.

DESCRIPTION OF THE PREFERRED EMBODIMENT

Figure 1:
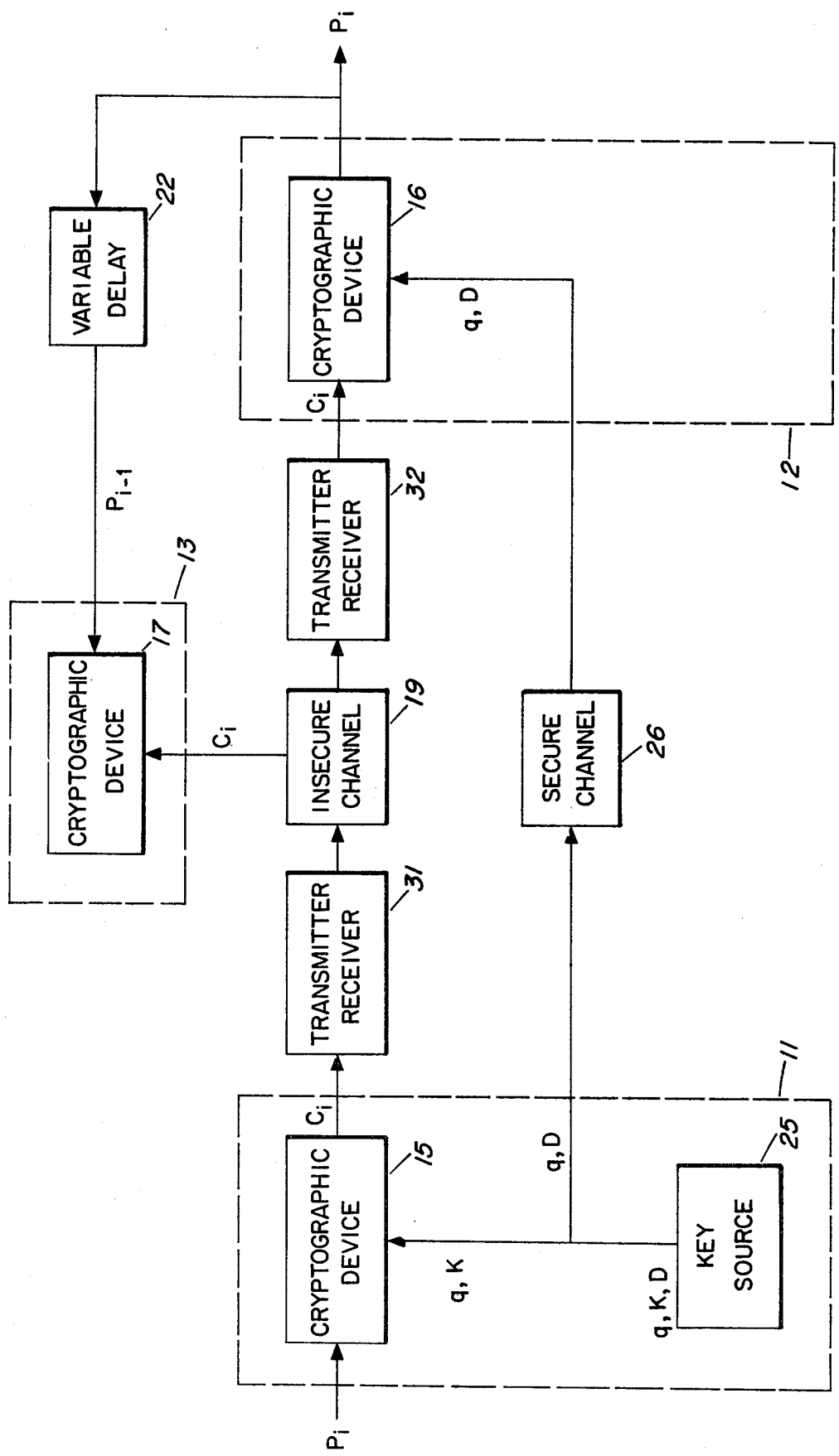
FIG. 1 is a block diagram of a cryptographic system that transmits a computationally secure cryptogram over an insecure communication channel.

Referring to FIG. 1, a cryptographic system is shown in which communications take place over an insecure communication channel 19, for example a telephone line. Two-way communication is exchanged on the insecure channel 19 between converser 11 and converser 12 using transmitter/receivers 31 and 32, for example modems such as Bell 201 modems. Converser 11 possesses a sequence of unenciphered or plaintext messages $P_1, P_2, \ldots$ to be communicated to converser 12. Converser 11 and converser 12 include cryptographic devices 15 and 16 respectively, for enciphering and deciphering information under the action of a secret enciphering key K and secret deciphering key D, respectively. The cryptographic device 15 enciphers the $i^{th}$ plaintext message $P_i$ into an enciphered message or ciphertext $C_i$ that is transmitted by converser 11 through the insecure channel 19; the ciphertext $C_i$ is received by converser 12 and deciphered by cryptographic device 16 to obtain the plaintext message $P_i$. An unauthorized party or eavesdropper 13 is assumed to have a cryptographic device 17 and to have access to the insecure channel 19, and therefore to $C_1, C_2, \ldots, C_i$. He is also assumed to have access to some or all of the past plaintext messages $P_1, P_2, \ldots, P_{i-1}$, as through the public release of previously enciphered messages (e.g., timed press releases) represented by the variable delay 22. He uses his knowledge of $P_1, P_2, \ldots, P_{i-1}$ and $C_1, C_2, \ldots, C_{i-1}$ to attempt to determine $P_i$ from $C_i$ or to determine how to alter $C_i$ so that when deciphered by the conversor 12 it will convey a false meaning of the eavesdropper's choice.

Converser 11 includes an independent key source 25 which generates numbers or signals that represent numbers. For example, the key source may be a random number generator that is implemented from a noisy amplifier (e.g., Fairchild u 709 operational amplifier) with a polarity detector. Key source 25 generates three signals, q, K and D. Signals q and D are transmitted secretly via a secure means 26 such as courier or registered mail to converser 12. q is chosen to be a large prime number; K is an independent random number chosen uniformly from the set of integers (1,2, ..., q−2); and D is the multiplicative inverse in modular q−1 arithmetic of K, chosen so that the product KD is congruent to 1 modulo q−1. That is, if KD is divided by q−1, then the remainder is 1.

The calculation of D from K and q is easily carried out using Euclid's algorithm (see, for example, Knuth, *The Art of Computer Programming, Vol. 2, Seminumerical Algorithms,* Addison-Wesley, Reading, Mass., 1969, p. 315, exercise 15, p. 253 solution to exercise 15 and p. 302 algorithm X). Euclid's algorithm can be carried out using hardware of the type described later in this application. It is well-known that if q is prime then $$z^{q-1} = 1 \pmod{q}, 1 \leq h \, z \leq q-1 \qquad (1)$$

Consequently arithmetic in the exponent is done modulo q−1, not modulo q. That is $$z^x = z^{x(\bmod q-1)} \pmod{q} \qquad (2)$$

for all integers x. As an example, $2^8 = 256 = 4 \pmod 7$ as is $2^2$ because the exponents 8 and 2 are congruent mod q−1=6.

To construct a cryptosystem, let P, K, C and D denote the plaintext message, secret enciphering key, ciphertext (or cryptogram), and secret deciphering key respectively with the restrictions $$1 \leq P \leq q-1 \qquad (3)$$

$$1 \leq C \leq q-1 \qquad (4)$$

$$1 \leq K \leq q-2 \qquad (5)$$

$$GCD(K, q-1) = 1 \qquad (6)$$

In practice, P probably would be limited to be an l bit integer where $l = \log_2(q-1)$. Also, K=1 probably would be excluded because then P=C. Equation (6) implies that K is relatively prime to q−1 so that $$D = K^{-1} \pmod{q-1} \qquad (7)$$

is well-defined with $$1 \leq D \leq q-2; \text{ thus,} \qquad (8)$$

D, the secret deciphering key, is generated from a multiplicative inverse in modular q−1 arithmetic of the secret enciphering key, K. Now let $$C = P^K \pmod{q} \qquad (9)$$

be the enciphering operation; and, the enciphered message or ciphertext C is generated by exponentiating, in modular q arithmetic, a plaintext message P with the secret enciphering key K. Then $$P = C^D \pmod{q} \qquad (10)$$

is the deciphering operation; and, the plaintext message P is deciphered from the ciphertext C by exponentiating, in modular q arithmetic, the enciphered message or ciphertext C with the secret deciphering key D. Each operation, enciphering and deciphering, is easily performed with the hardware described below. Computing D from K need only be done once and requires only on the order of log q operations using Euclid's algorithm (Knuth, op cit, Section 4.5.2).

Cryptanalysis, on the other hand, is equivalent to computing a logarithm over GF(q), the finite field with q elements, and is thus computationally infeasible for a properly chosen value of q. A task is considered computationally infeasible if its cost as measured by either the amount of memory used or the computing time is finite but impossibly large, for example, on the order of approximately $10^{30}$ operations with existing computational methods and equipment. This task is infeasible because $$K = \log_P C \text{ over } GF(q) \qquad (11)$$

so that even though the cryptanalyst knows plaintext-ciphertext pairs, it is as hard to find the key as to find a logarithm mod q. Such a known plaintext cryptanalytic attack is a standard test applied to certify a system as secure. It, and variations, occur in practice as well. The best, known algorithms for computing a logarithm over GF(q) require at least $\sqrt{q}$ operations if q is properly chosen. If q is a 200 digit number then $\sqrt{q}$ is approximately $10^{100}$ and performing this many operations is infeasible. On the other hand, enciphering and deciphering require only one exponentiation mod q and are easily implemented.

Figure 2:
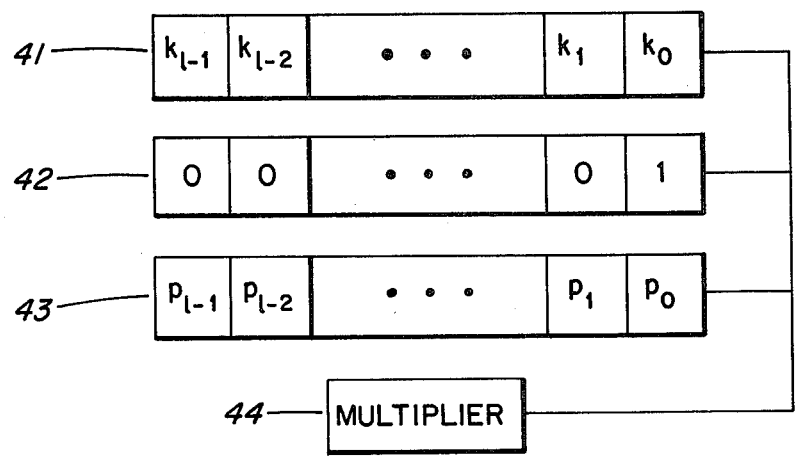
FIG. 2 is a block diagram of a cryptographic apparatus for raising various numbers to various powers in modulo arithmetic.

The cryptographic devices 15 and 16, for raising various numbers to various powers modulo q, can be implemented in electronic circuitry as shown in FIG. 2. For ease of illustration, FIG. 2 depicts raising P to the K power modulo q; raising C to the D power modulo q is obtained by initially loading C and D instead of P and K, into the P and K registers 43 and 41.

FIG. 2 shows the initial contents of three registers 41, 42, and 43. The binary representation of $K(k_{l-1}, k_{l-2}, \ldots, k_1, k_0)$ is loaded into the K register 41; 1 is loaded into the R register 42; and, the binary representation of P is loaded into the P register 43, corresponding to i=0. The number of bits l in each register is the least integer such that $2^l \geq q$. If l=200, then all three registers can be obtained from a single 1024 bit random access memory (RAM) such as the Intel 2102. The implementation of multiplier 44, for multiplying two numbers modulo q, will be described in more detail later.

Referring to FIG. 2, if the low order bit, containing $k_0$, of the K register 41 equals 1 then the R register 42 and the P register 43 contents are multiplied modulo q and their product, also an l bit quantity, replaces the contents of the R register 42. If $k_0=0$, the R register 42 contents are left unchanged. In either case, the P register 43 is then loaded twice into the multiplier 44 so that the square, modulo q, of the P register 43 contents is computed. This value, $P^{(2i+1)}$, replaces the contents of the P register 43. The K register 41 contents are shifted one bit to the right and a 0 is shifted in at the left so its contents are now $0k_{l-1}, k_{l-2}, \ldots, k_2 k_1$.

The low order bit, containing $k_1$, of the K register 41 is examined. If it equals one then, as before, the R register 42 and P register 43 contents are multiplied modulo q and their product replaces the contents of the R register 42. If $k_0=0$, the R register 42 contents are left unchanged. In either case, the contents of the P register 43 are replaced by the square, modulo q, of the previous contents. The K register 41 contents are shifted one bit to the right and a 0 is shifted in at the left so its contents are now $00k_{l-1},k_{l-2}, \ldots k_3,k_2$.

This process continues until the K register 41 contains all 0's, at which point the value of $p^K$ modulo q is stored in the R register 42.

An example is helpful is following this process. Taking q=23, we find l=5 from $2^l \geq q$. If p=7 and K=18, then
$p^K=7^{18}=1628413597910449=23(70800591213497)+$-18 so $P^K$ modulo q equals 18. This straightforward but laborious method of computing $P^K$ modulo q is used as a check to show that the method of FIG. 2, shown below, yields the correct result. The R register 42 and P register 43 contents are shown in decimal form to facilitate understanding.

| i | K (in binary) | R | P |
|---|---|---|---|
| 0 | 10010 | 1 | 7 |
| 1 | 01001 | 1 | 3 |
| 2 | 00100 | 3 | 9 |
| 3 | 00010 | 3 | 12 |
| 4 | 00001 | 3 | 6 |
| 5 | 00000 | 18 | 13 |

The row marked i=0 corresponds to the initial contents of each register, K=18, R=1 and P=7. Then, as described above, because the low order bit of K register 41 is 0, the R register 42 contents are left unchanged, the contents of the P register 43 are replaced by the square, modulo 23, of its previous contents ($7^2=49=2\times23+3=3$ modulo 23), the contents of the K register 41 are shifted one bit to the right, and the process continues. Only when i=1 and 4 do the low order bit of the K register 41 contents equal 1, so only going from i=1 to 2 and from i=4 to 5 is the R register 42 replaced by RP modulo q. When i=5, K=0 so the process is complete and the result, 18, is in the R register 42.

Note that the same result, 18, is obtained here as in the straightforward calculation of $7^{18}$ modulo 23, but that here large numbers never resulted.

Another way to understand the process is to note that the P register contains P, $P^2$, $P^4$, $P^8$ and $P^{16}$ when i=0,1,2,3, and 4 respectively, and that $P^{18}=P^{16}P^2$, so only these two values need to be multiplied.

Figure 3:
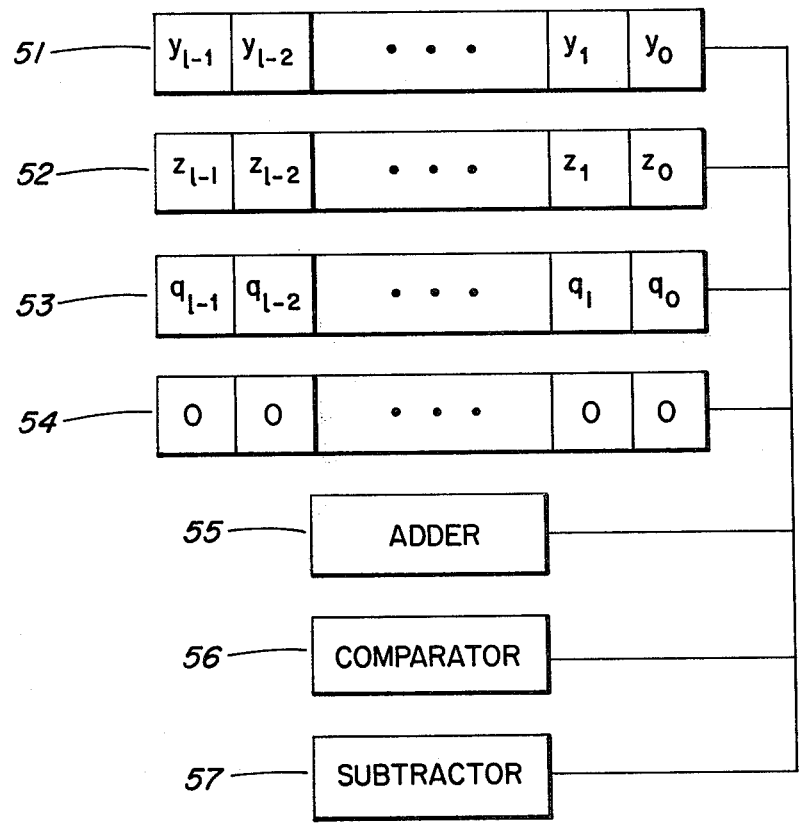
FIG. 3 is a block diagram of a multiplier for performing multiplications in the cryptographic apparatus of FIG. 2.

FIG. 3 continues the description of this illustrative implementation by depicting an implementation of the modulo q multiplier 44 in FIG. 2. The two numbers, y and z, to be multiplied are loaded into the Y and Z registers 51 and 52 respectively, and q is loaded in the Q register 53. The product yz modulo q will be produced in the F register 54 which is initially set to 0. If l=200, then all four registers can be obtained from a single 1024 bit RAM such as the Intel 2102. The implementation of FIG. 3 is based on the fact that yz mod $q=y_0z$ mod $q+2y_1z$ mod $q+4y_2z$ mod $q+ \ldots +2^{l-1}y_{l-1}z$ mod q.

To multiply y times z, if the right-most bit, containing $y_0$, of the Y register 51 is 1, then the contents of the Z register 53 are added to the F register 54 by adder 55. If $Y_0=0$, then the F register 54 is unchanged. Then the Q and F register contents are compared by comparator 56 to determine if the contents of the F register 54 are greater than or equal to q, the contents of the Q register 53. If the contents of the F register 54 are greater than or equal to q then subtractor 57 subtracts q from the contents of the F register 54 and places the difference in the F register 54, if less than q the F register 54 is unchanged.

Next, the contents of Y register 51 are shifted one bit to the right and a 0 is shifted in at the left so its contents become $0,y_{l-1},y_{l-2}, \ldots y_2,y_1$, so that $y_1$ is ready for computing $2y_1z$ mod q. The quantity 2z mod q is computed for this purpose by using adder 55 to add z to itself, using comparator 56 to determine if the result, 2z, is less than q, and using subtractor 57 for subtracting q from 2z if the result is not less than q. The result, 2z mod q is then stored in the Z register 52. The right-most bit, containing $y_1$, of the Y register 51 is then examined, as before, and the process repeats.

This process is repeated a maximum of l times or until the Y register 51 contains all 0's, at which point xy modulo q is stored in the F register 54.

As an example of these operations, consider the problem of computing $7\times7$ modulo 23 needed to produce the second state of the P register when $7^{18}$ mod 23 was computed. The following steps show the successive contents of the Y, Z and F registers which result in the answer $7\times7=3$ modulo 23.

| i | Y (in binary) | Z | F |
|---|---|---|---|
| 0 | 00111 | 7 | 0 |
| 1 | 00011 | 14 | 0 + 7 = 7 |
| 2 | 00001 | 5 | 7 + 14 = 21 |
| 3 | 00000 | 10 | 21 + 5 = 3 mod 23 |

Figure 4:
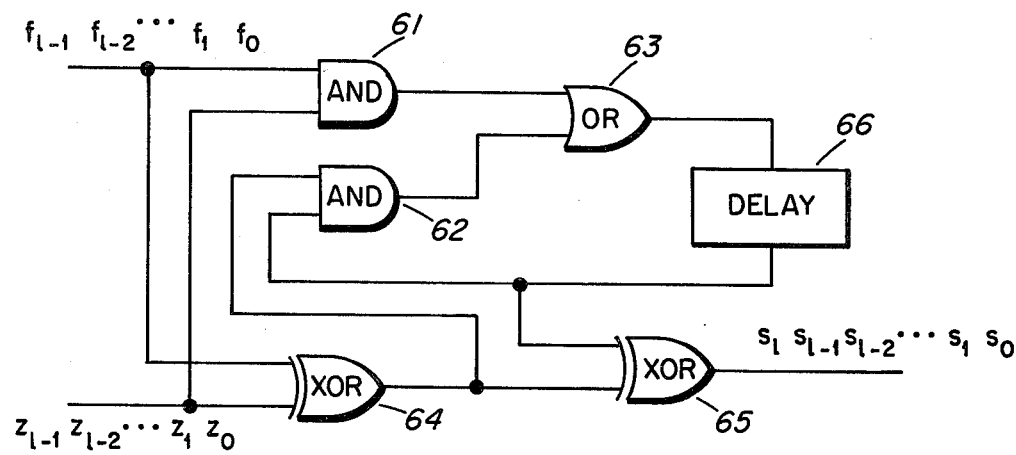
FIG. 4 is a detailed schematic diagram of an adder for performing additions in the multiplier of FIG. 3.

FIG. 4 depicts an implementation of an adder 55 for adding two l bit numbers p and z. The numbers are presented one bit at a time to the device, low order bit first, and the delay element 66, which stores the binary carry bit, is initially set to 0. The AND gate 61 determines if the carry bit should be a 1 based on $f_i$ and $z_i$ both being 1 and the AND gate 62 determines if the carry should be a 1 based on the previous carry being a 1 and one of $f_i$ or $z_i$ being 1. If either of these two conditions is met, the OR gate 63 has an output of 1 indicating a carry to the next stage. The two exclusive-or (XOR) gates 64 and 65 determine the $i^{th}$ bit of the sum, $s_i$, as the modulo-2 sum of $f_i$, $z_i$ and the carry bit from the previous stage. The delay 66 stores the previous carry bit. Typical parts for implementing these gates and the delay are SN7400, SN7404, and SN7474.

Figure 5:
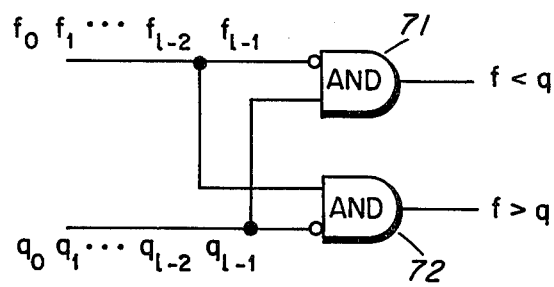
FIG. 5 is a detailed schematic diagram of a comparator for performing magnitude comparisons in the multiplier of FIG. 3.

FIG. 5 depicts an implementation of a comparator 56 for comparing two numbers f and q. The two numbers are presented one bit at a time, high order bit first. If neither the f<q nor the f>q outputs have been triggered after the last bits $f_0$ and $q_0$ have been presented, then f=q. The first triggering of either the f<q or the f>q output causes the comparison operation to cease. The two AND gates 71 and 72 each have one input inverted (denoted by a circle at the input). An SN7400 and SN7404 provide all of the needed logic circuits.

Figure 6:
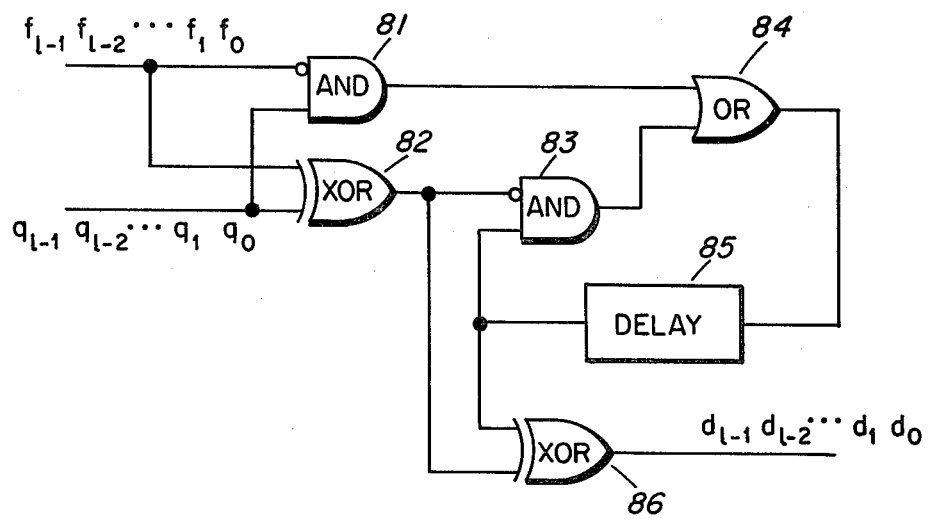
FIG. 6 is a detailed schematic diagram of a subtractor for performing subtractions in the multiplier of FIG. 3.

FIG. 6 depicts an implementation of a subtractor 57 for subtracting two numbers. Because the numbers subtracted in FIG. 3 always produce a non-negative difference, there is no need to worry about negative differences. The larger number, the minuend, is labelled f and the smaller number, the subtrahend, is labelled q. Both f and q are presented serially to the subtractor 57, low order bit first. AND gates 81 and 83, OR gate 84 and XOR gate 82 determine if borrowing (negative carrying) is in effect. A borrow occurs if either $f_i=0$ and $q_i=1$, or $f_i=q_i$ and borrowing occurred in the previous stage. The delay 85 stores the previous borrow state. The $i^{th}$ bit of the difference, $d_i$, is computed as the XOR, or modulo-2 difference, of $f_i$, $q_i$ and the borrow bit. The output of XOR gate 82 gives the modulo-2 difference between $f_i$ and $q_i$, and XOR gate 86 takes the modulo-2 difference of this with the previous borrow bit. Typical parts for implementing these gates and the delay are SN7400, SN7404 and SN7474.

The eavesdropper 13 is assumed to have a cryptographic device 17 and to have access to all signals $C_1$, $C_2$, ..., $C_i$ transmitted through the insecure channel 19. He also may have past plaintext messages $P_1$, $P_2$, ..., $P_{i-1}$ as represented by the variable delay 22. The eavesdropper in theory could obtain K or D from q, $P_1$ and $C_1$ by raising $P_1$ to the first, second, third, etc., powers until $C_1$ was obtained; the power which successfully yields $C_1$ may be K. This search is prevented by choosing q to be a large number; if q is a 200 bit quantity, the average number of trials before success is on the order of $2^{199}=8\times 10^{59}$ and is computationally infeasible. Improved algorithms for computing logarithms over GF(q) (if $Y=a^X$ mod q, X is the logarithm of Y to the base over GF(q)) are known but, if $q=2r+1$ with q and r being prime, then the most efficient known algorithm requires approximately $q^{\frac{1}{2}}$ operations. Taking q to be a 200 bit number, about $2^{100}=10^{30}$ operations are required, still computationally infeasible. An example of such a pair is $r=(2^{121}\cdot 5^2\cdot 7^2\cdot 11^2\cdot 13\cdot 17\cdot 19\cdot 23\cdot 29\cdot 31\cdot 37\cdot 41\cdot 43\cdot 47\cdot 53\cdot 59)+1$ and $q=2r+1$. Other restrictions on q or K or D may also be imposed.

There are many methods for implementing this form of the invention. The signal q could be public knowledge rather than generated by the key source 25; or the key source 25 could be located at conversor 12 instead of at conversor 11.

In some applications, it will prove valuable to use the insecure channel 19, instead of the secure channel 26, to exchange the keying information. This can be done as described in the patent application "Cryptographic Apparatus and Method," Ser. No. 830,754 filed Sept. 6, 1977.

Authentication is obtained because an opponent must determine the key if he is to inject a message, in enciphered form, that will be deciphered into a meaningful message of his choosing. The difficulty involved in foiling the authentication protection of the system is therefore equal to the difficulties involved in foiling its privacy protection.

Variations on the above described embodiment are possible. For example, in the above method based on logarithms over GF(q), m-dimensional vectors, each of whose components are between 0 and q-1 also could be used. Then all operations are performed in the finite field with $q^m$ elements, $GF(q^m)$, which operations are well-described in the literature. Or, q need not be prime, in which case D must equal the multiplicative inverse of K modulo $\phi(q)$. The function $\phi(q)$ is known as Euler's totient function and equals the number of positive integers less than q and relatively prime to q. When q is prime $\phi(q)=q-1$ so equation (7) is a special case of this more general rule. As a small example, consider q=15 so $\phi(q)=8$ (1,2,4,7,8,11, 13 and 14 are relatively prime to 15). Taking K=3 then $D=K^{-1}$ mod $\phi(q)=3$ (in general K and D will be different). If P=2 then $C=P^K$ mod q=8 and P can be recovered by the receiver 12 as $C^D$ mod $q=8^3$ mod 15=2, which is correct. If the factorization of q contains a repeated factor then a problem arises in that $C=P^K$ mod q and $P=C^D$ mod q are not always inverse transformations, even if $D=K^{-1}$ mod $\phi(q)$. This problem can be overcome by avoiding certain values of P. For example, if $q=44=2^2\cdot 11$, then any value of P which is divisible by 2, but not by 4, will not be obtained by enciphering and then deciphering. As an example, when K=3, D=7 and $\phi(q)=20$, if P=2 then $C=P^K$ mod q=9 but $C^P$ mod $q=8^7$ mod $44=24\neq P$.

Thus, although the best mode contemplated for carrying out the present invention has been therein shown and described, it will be apparent that modification and variation may be made without departing from what is regarded to be the subject matter of this invention.

What is claimed is:

1. In a method of communicating securely over an insecure communication channel of the type which communicates a message from a transmitter to a receiver by enciphering the message with a secret enciphering key at the transmitter, transmitting the enciphered message from the transmitter to the receiver, and deciphering the enciphered message with a secret deciphering key at the receiver, the improvement characterized by:

generating the secret deciphering key as the multiplicative inverse, in modular arithmetic, of the secret enciphering key;

generating the enciphered message by exponentiating, in modular arithmetic, the message with the secret enciphering key;

deciphering the enciphered message by exponentiating, in modular arithmetic, the enciphered message with the secret deciphering key, wherein the step of:

generating the secret deciphering key is performed by generating a secret deciphering key D, such that $$D=K^{-1}(\mathrm{mod}\ q-1)$$

where $1\leq D\leq q-2$, q is a prime number, and the secret enciphering key K is an independent random number chosen uniformly from the set of integers (1, 2, ... q−2) which are relatively prime to q−1;

generating the enciphered message is performed by generating an enciphered message C, such that $$C=P^K(\mathrm{mod}\ q)$$

where P is the message; and deciphering the enciphered message is performed by generating the message P, where $$P=C^D(\mathrm{mod}\ q).$$

2. In an apparatus for communicating securely over an insecure communication channel of the type which communicates a message from a transmitter to a receiver comprising means for enciphering the message with a secret enciphering key at the transmitter, means for transmitting the enciphered message from the transmitter to the receiver, and means for deciphering the enciphered message with a secret deciphering key at the receiver, the improvement characterized by:

means for generating the secret deciphering key as the multiplicative inverse, in modular arithmetic, of the secret enciphering key;

means for generating the enciphered message by exponentiating, in modular arithmetic, the message with the secret enciphering key, having an input connected to receive the secret enciphering key, having another input connected to receive the message, and having an output that generates the enciphered message, and means for deciphering the enciphered message by exponentiating, in modular arithmetic, the enciphered message with the secret deciphering key, having an input connected to receive the secret deciphering key, having another input connected to receive the enciphered message, and having an output that generates the message, wherein said means for generating the secret deciphering key includes means for generating a secret deciphering key D, such that $D = K^{-1} (\mod q-1)$ where $\leq D \leq q-2$, q is a prime number, and the secret enciphering key K is an independent random number chosen uniformly from the set of integers (1, 2, ..., q−2) which are relatively prime to q−1;

wherein said means, for generating the enciphered message by exponentiating, includes means for generating an enciphered message C, such that $C = P^K (\mod q)$ where P is the message; and wherein said means, for deciphering the enciphered message by exponentiating, includes means for generating the message P, where, $P = C^D (\mod q)$.

* * * * *